US012617255B2

(12) United States Patent
Wang et al.

(10) Patent No.: US 12,617,255 B2
(45) Date of Patent: May 5, 2026

(54) VENTILATOR AND VEHICLE HAVING THE SAME

(71) Applicant: XIAMEN DONESTY ECOMMERCE CO., LTD., Xiamen (CN)

(72) Inventors: Hao Wang, Xiamen (CN); Haojun Hong, Xiamen (CN); Jingshan Wei, Xiamen (CN); Weida Chen, Xiamen (CN)

(73) Assignee: XIAMEN DONESTY ECOMMERCE CO., LTD., Xiamen (CN)

( * ) Notice: Subject to any disclaimer, the term of this patent is extended or adjusted under 35 U.S.C. 154(b) by 354 days.

(21) Appl. No.: 18/490,784

(22) Filed: Oct. 20, 2023

(65) Prior Publication Data

US 2025/0121655 A1 Apr. 17, 2025

Related U.S. Application Data

(63) Continuation of application No. PCT/CN2023/124330, filed on Oct. 12, 2023.

(51) Int. Cl.
*B60H 1/26* (2006.01)
*B60H 1/24* (2006.01)

(52) U.S. Cl.
CPC ............. *B60H 1/262* (2013.01); *B60H 1/245* (2013.01)

(58) Field of Classification Search
CPC ..... B60H 1/262; B60H 1/245; B60H 1/00464
See application file for complete search history.

(56) References Cited

U.S. PATENT DOCUMENTS

| | | | | |
|---|---|---|---|---|
| 1,183,804 | A | * | 5/1916 | Determann ............... F24F 7/02 |
| | | | | 49/363 |
| 5,374,215 | A | * | 12/1994 | Crider .................... B60H 1/262 |
| | | | | 454/136 |
| 2007/0184775 | A1 | * | 8/2007 | Perkins .................. B60H 1/262 |
| | | | | 454/273 |

FOREIGN PATENT DOCUMENTS

| | | |
|---|---|---|
| CN | 107953748 A | 4/2018 |
| CN | 210265219 U | 4/2020 |
| CN | 211852235 U | 11/2020 |
| CN | 214664907 U | 11/2021 |

OTHER PUBLICATIONS

International Search Report dated May 16, 2024 in International Application No. PCT/CN2023/124330. English translation attached. Written Opinion of the ISA dated May 16, 2024 in International Application No. PCT/CN2023/124330. English translation attached.

* cited by examiner

*Primary Examiner* — Allen R. B. Schult

(57) ABSTRACT

Provided are a ventilator and a vehicle having the ventilator. The ventilator includes a housing assembly, a fan blade, a first drive device, a cover plate assembly, an air guide sleeve, and a controller. The housing assembly has a first accommodation space and a vent. The fan blade and the first drive device are mounted in the first accommodation space. The first drive device is configured to drive the fan blade to rotate about a rotation axis of the fan blade, and is electrically connected to the controller. The cover plate assembly is provided at a side of the housing assembly. The air guide sleeve is provided between the cover plate assembly and the housing assembly and configured to be lifted or lowered relative to the housing assembly to expose or cover the vent. A second accommodation space is defined by the air guide sleeve and the cover plate assembly.

19 Claims, 8 Drawing Sheets

VENTILATOR AND VEHICLE HAVING THE SAME

CROSS-REFERENCE TO RELATED APPLICATIONS

This application is a continuation of International Application No. PCT/CN2023/124330, filed on Oct. 12, 2023, the entire disclosure of which is incorporated herein by reference.

FIELD

The present disclosure relates to the field of ventilator technologies, and more particularly, to a ventilator and a vehicle having the same.

BACKGROUND

In the related art, when it is necessary for a ventilator to ventilate, an upper cover plate is usually rotated by a predetermined angle to expose a vent. Such a solution, due to a certain limitation of an opening angle of the upper cover plate, will result in a smaller amount of ventilation at the vent, which in turn result in low exhaust efficiency and poor exhaust performance of the ventilator.

SUMMARY

The present disclosure aims at solving one of the above technical problems in the related art at least to some extent. To this end, the present disclosure provides a ventilator. When a vent is exposed, there is a large amount of ventilation at the vent.

The present disclosure further provides a vehicle having the ventilator as described above.

A ventilator according to embodiments of the present disclosure includes a housing assembly, a fan blade, a first drive device, a cover plate assembly, an air guide sleeve, and a controller. The housing assembly internally has a first accommodation space. Further, the housing assembly has a vent. The fan blade is mounted in the first accommodation space. The first drive device is mounted in the first accommodation space and configured to drive the fan blade to rotate about a rotation axis of the fan blade. The cover plate assembly is provided at a side of the housing assembly. The air guide sleeve is provided between the cover plate assembly and the housing assembly. The air guide sleeve is configured to be lifted or lowered relative to the housing assembly to expose or cover the vent. A second accommodation space is defined by the air guide sleeve and the cover plate assembly. The controller is electrically connected to the first drive device.

According to the ventilator of the embodiments of the present disclosure, by lifting or lowering the air guide sleeve relative to the housing assembly, the vent can be exposed or covered. Such a way of exposing the vent has less influence on an amount of ventilation at the vent, and thus the ventilator has high exhaust efficiency and superior exhaust performance.

According to some embodiments of the present disclosure, the ventilator further includes a second drive device. The second drive device is configured to drive the air guide sleeve to lift and lower. The second drive device is electrically connected to the controller.

According to some embodiments of the present disclosure, the second drive device includes a lifting motor and a screw rod. The air guide sleeve is fixedly provided with a nut. The lifting motor is provided in the second accommodating space and configured to drive the screw rod to rotate. The nut is screwed with the screw rod to drive the nut to move in an extending direction of the screw rod when the screw rod rotates.

According to some embodiments of the present disclosure, the air guide sleeve has an air guide wall located at an end of the air guide sleeve close to the vent. The air guide wall is constructed into an arc-shaped sectorial structure recessed towards the cover plate assembly. A central part of the air guide wall protrudes towards the vent relative more than an edge of the air guide wall.

According to some embodiments of the present disclosure, the housing assembly includes a housing body, a panel, and a protective sleeve. The housing body has a body vent. The panel has a panel through opening. The protective sleeve is located at a side of the housing body facing away from the cover plate assembly. The protective sleeve and the housing body pass through the panel through opening and are connected and fixed to each other. The protective sleeve has a protective vent connected to the body vent to form the vent. The air guide sleeve is configured to expose or cover the body vent.

According to some embodiments of the present disclosure, the housing body includes a housing body portion and a body connection cylinder connected to each other. The protective sleeve includes a protective body portion and a protective connection cylinder connected to each other. The body connection cylinder is threadedly connected to the protective connection cylinder in a sleeved manner. The panel is arranged around the body connection cylinder and the protective connection cylinder, and located between the housing body portion and the protective body portion.

According to some embodiments of the present disclosure, a surface of the housing body portion facing towards the panel includes a first mounting surface. A surface of the panel facing towards the housing body portion includes a second mounting surface. The first mounting surface is spaced apart from the second mounting surface.

According to some embodiments of the present disclosure, the housing assembly includes a permeable protective mesh mounted at the protective sleeve and covering the protective vent.

According to some embodiments of the present disclosure, the panel is provided with a control button, a light, and a light switch configured to turn on or off the light. The control button is configured to at least control the first drive device. The ventilator further includes an electrical connector. Wires are connected between the controller and the control button, between the controller and the first drive device, between the controller and the light, and between the controller and the light switch. The wires are plugged to the electrical connector.

According to some embodiments of the present disclosure, the panel is provided with a resilience limiter. The protective sleeve is provided with teeth at an outer peripheral wall of the protective sleeve. The resilience limiter has a locking state in which the resilience limiter is engaged with the teeth to limit a rotation of the protective sleeve and an unlocking state in which the resilience limiter is disengaged from the teeth.

According to some embodiments of the present disclosure, the ventilator further includes an auxiliary support located in the second accommodation space and connected and fixed to the housing body. The controller is mounted at the auxiliary support.

According to some embodiments of the present disclosure, the housing body is fixedly provided with a guide post. The air guide sleeve is provided with a linear bearing. The guide post passes through the linear bearing. The auxiliary support has a support fixing hole. The ventilator further includes a support stud. The support stud has an end passing through the support fixing hole to be screwed to the guide post and another end configured to fix the cover plate assembly.

According to some embodiments of the present disclosure, the ventilator further includes a first limit switch, a second limit switch, a limit lever, and a restoring spring. The first limit switch and the second limit switch are both mounted at the auxiliary support, and are electrically connected to the controller and the lifting motor for driving the air guide sleeve to lift or lower. The first limit switch has a contact facing towards the air guide sleeve and configured to detect a position where the air guide sleeve is furthest from the vent and a duct opened state is generated. The second limit switch has a contact facing away from the air guide sleeve. The restoring spring is configured to exert an elastic force on the limit lever to restore the limit lever to an initial position. The air guide sleeve is configured to move towards the vent to be in contact with the limit lever and further drive the limit lever to move, activating the contact of the second limit switch by the limit lever to detect a position where the air guide sleeve is nearest to the vent and a duct closed state is generated.

According to some embodiments of the present disclosure, the ventilator further includes a rainwater sensor mounted at the housing body and electrically connected to the controller. The rainwater sensor is configured to detect rainwater, and control, when rainwater is detected by the rainwater sensor, the air guide sleeve to lower to cover the vent.

According to some embodiments of the present disclosure, the cover plate assembly includes a cover body and a photovoltaic panel. The photovoltaic panel is mounted at a side of the cover body facing away from the housing body. The second accommodation space is formed between the cover body and the air guide sleeve. The photovoltaic panel is electrically connected to the controller.

According to some embodiments of the present disclosure, the ventilator further includes a storage battery provided in the second accommodation space and electrically connected to the photovoltaic panel.

According to some embodiments of the present disclosure, the panel is provided with an external power interface electrically connected to the controller.

According to some embodiments of the present disclosure, the fan blade is configured to: drive, when rotating about the rotational axis of the fan blade in a first direction, airflow in the vent to flow from the cover plate assembly to the housing assembly; and drive, when rotating about the rotational axis of the fan blade in a direction opposite to the first direction, airflow in the vent to flow from the housing assembly to the cover plate assembly.

According to some embodiments of the present disclosure, an end of the body vent facing towards the air guide sleeve is provided with a seal ring.

A vehicle according to embodiments of the present disclosure includes the ventilator as described above. The ventilator is mounted at a roof of the vehicle. The cover plate assembly is located outside the roof.

According to the vehicle of the embodiments of the present disclosure, by lifting or lowering the air guide sleeve relative to the housing assembly, the vent of the ventilator can be exposed or covered. Such a way of exposing the vent has less influence on an amount of ventilation at the vent, and thus the ventilator has high exhaust efficiency and superior exhaust performance. Therefore, better air exchange between an interior of the vehicle and an exterior of the vehicle can be realized.

Additional aspects and advantages of the present disclosure will be given at least in part in the following description, or become apparent at least in part from the following description, or can be learned from practicing of the present disclosure.

Figure 1:
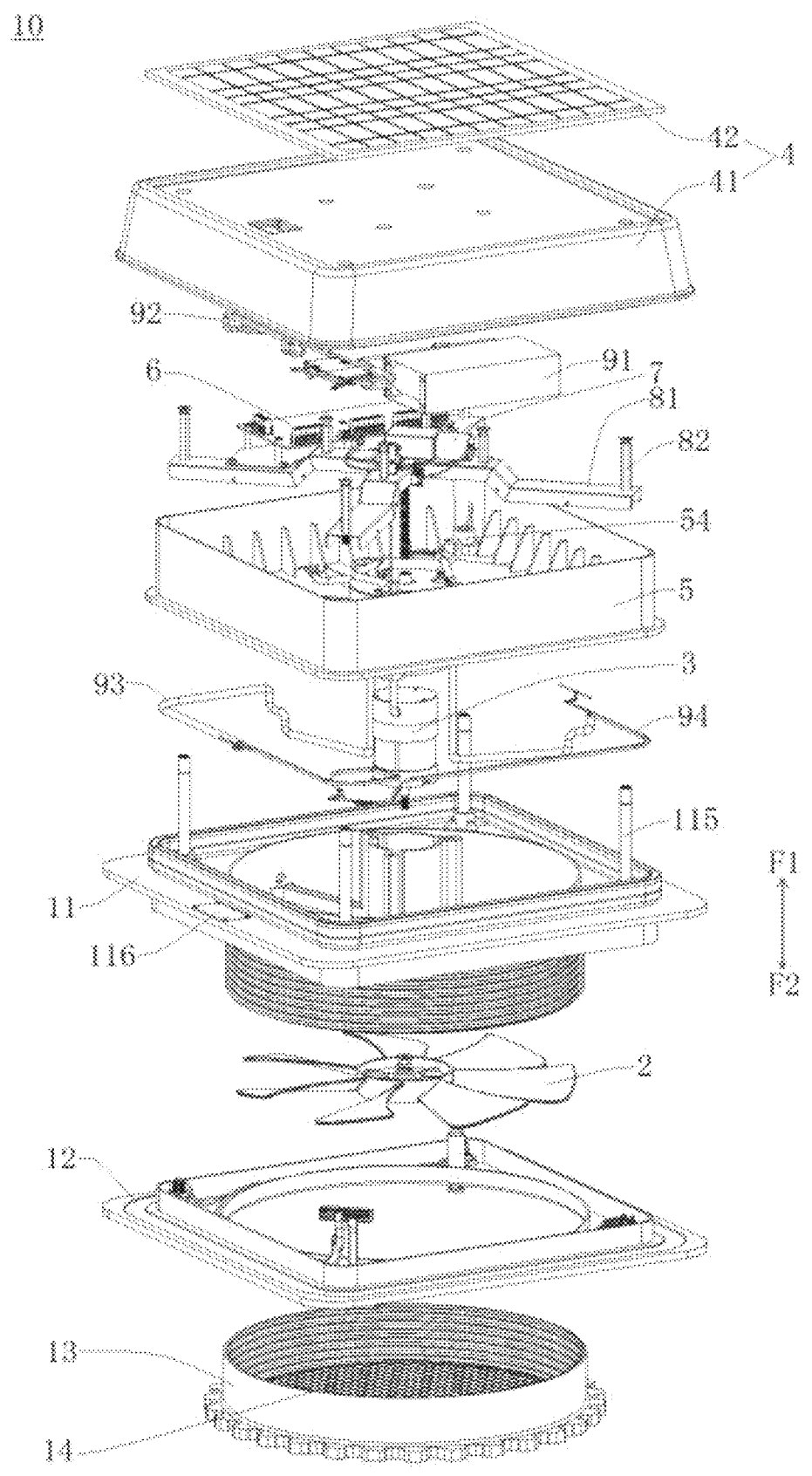
FIG. 1 is a schematic exploded view of a ventilator according to an embodiment of the present disclosure.

The reference signs are explained as follows:

10, ventilator; 1, housing assembly; 11, housing body; 111, body vent; 112, housing body portion; 113, body connection cylinder; 114, first mounting surface; 115, guide post; 116, rainwater sensor; 117, seal ring; 118, lever hole; 119, motor compartment; 12, panel; 121, panel through opening; 122, second mounting surface; 123, control button; 1231, gear adjustment knob; 1232, forward-reverse-rotation switch; 124, external power interface; 125, light switch 126; 127, resilience limiter; 13, protective sleeve; 131, protective vent; 132, protective body portion; 133, protective connection cylinder; 134, teeth; 14, protective mesh; 2, fan blade; 3, first drive device; 4, cover plate assembly; 41, cover body; 411, cover top wall; 412, cover outer side wall; 413, cover inner side wall; 414, battery mounting position; 415, wire routing groove; 42, photovoltaic panel; 5, air guide sleeve;

51, air guide wall; 52, nut; 53, mounting hole; 54, linear bearing; 55, side wall of air guide sleeve; 56, air guide sleeve body; 57, air guide sleeve cover sheet; 6, controller; 7, second drive device; 71, lifting motor; 72, screw rod; 81, auxiliary support; 82, support stud; 83, first limit switch; 84, second limit switch; 85, limit lever; 851, lever first arm; 852, lever second arm; 853, lever connection arm; 86, restoring spring; 91, storage battery; 92, photovoltaic power cord; 93, power cable; 94, control electric cable; 95, electrical connector; 20, roof.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

In the description of the present disclosure, terms "first" and "second" are only used for descriptive purposes, and cannot be understood as indicating or implying relative importance or implicitly indicating the number of the indicated technical features. Therefore, the features associated with "first" and "second" may explicitly or implicitly include at least one of the features. In the description of the present disclosure, "plurality" means at least two, unless otherwise specifically defined.

A ventilator 10 and a vehicle having the ventilator 10 according to embodiments of the present disclosure will be described in detail below with reference to FIG. 1 to FIG. 18.

Figure 2:
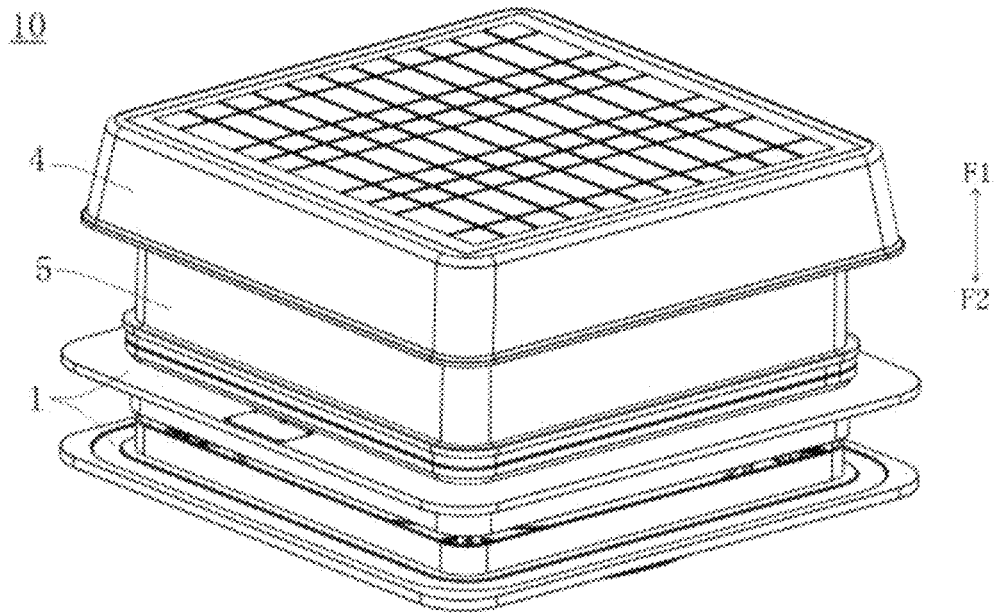
FIG. 2 is a schematic assembly view of a ventilator according to an embodiment of the present disclosure in a direction when a vent is covered.
Figure 3:
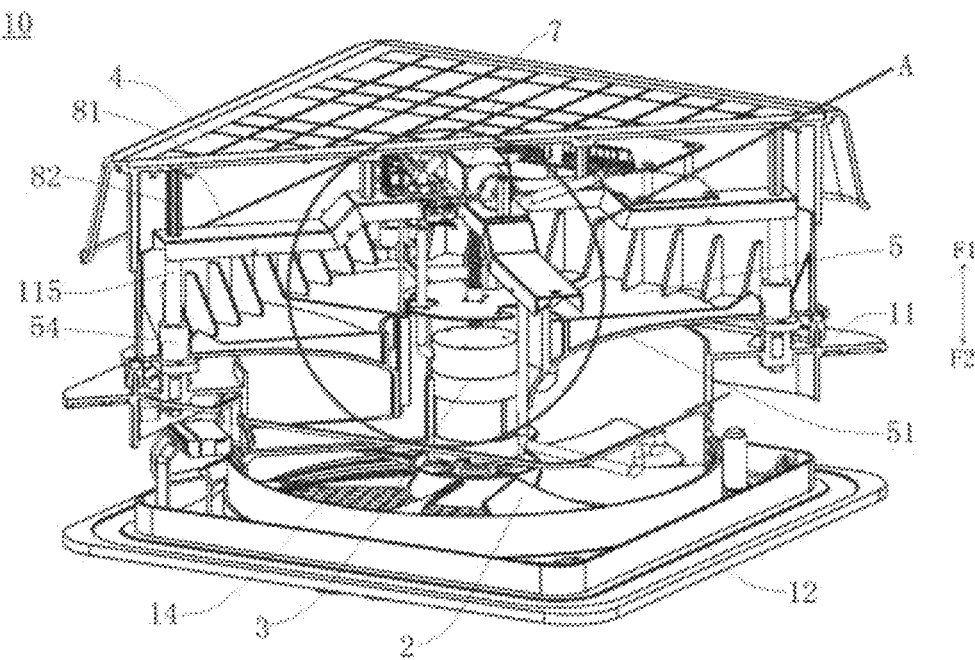
FIG. 3 is a cross-sectional view of the ventilator shown in FIG. 2.

Referring to FIG. 1 to FIG. 3, the ventilator 10 according to the embodiments of the present disclosure may include a housing assembly 1, a fan blade 2, a first drive device 3, a cover plate assembly 4, an air guide sleeve 5, and a controller 6.

The housing assembly 1 internally has a first accommodation space. Further, the housing assembly 1a has a vent. The vent may extend through the housing assembly 1 in an axial direction of the housing assembly 1 (i.e., F1-F2 direction).

The fan blade 2 is mounted in the first accommodation space. The fan blade 2 can rotate about a rotation axis of the fan blade 2 in the first accommodation space, and drive airflow at the vent to flow when the fan blade 2 rotates.

The first drive device 3 is mounted in the first accommodation space. In this way, the housing assembly 1 can protect the first drive device 3 from being exposed, which would affect a service life of the first drive device 3. The first drive device 3 is configured to drive the fan blade 2 to rotate about the rotation axis of the fan blade 2. In an exemplary embodiment, the first drive device 3 may drive the fan blade 2 to rotate about the rotation axis of the fan blade 2 forwardly or reversely. In an exemplary embodiment, when the fan blade 2 rotates forwardly, the fan blade 2 can drive airflow to flow in a direction from F1 to F2, and when the fan blade 2 rotates reversely, the fan blade 2 can drive airflow to flow in a direction from F2 to F1.

The cover plate assembly 4 is provided at a side of the housing assembly 1. As shown in FIG. and FIG. 3, the cover plate assembly 4 is disposed at an upper side of the housing assembly 1.

The air guide sleeve 5 is provided between the cover plate assembly 4 and the housing assembly 1. The air guide sleeve 5 is configured to be lifted or lowered relative to the housing assembly 1 to expose or cover the vent. When the air guide sleeve 5 is lifted to move away from the housing assembly 1, the vent is exposed, and an air duct is formed at the vent. In this case, airflow at two axial ends of the housing assembly 1 can flow through the air duct for circulation, as shown in FIG. 6 to FIG. 9. When the air guide sleeve S is lowered to be in close contact with the housing assembly 1, the vent is covered, and thus the air duct is closed. In this case, the airflow at the two axial ends of the housing assembly 1 cannot flow through the air duct, as shown in FIG. 2 to FIG. 5.

A second accommodation space is defined by the air guide sleeve 5 and the cover plate assembly 4. When the air guide sleeve 5 is lifted to move away from the housing assembly 1, a volume of the second accommodation space decreases. In a state shown in FIG. 6 to FIG. 9, the air guide sleeve 5 is furthest away from the housing assembly 1. When the air guide sleeve 5 is lowered to be in close contact with the housing assembly 1, the volume of the second accommodation space increases. In a state shown in FIG. 2 to FIG. 5, the air guide sleeve 5 is nearest to the housing assembly 1.

The second accommodation space is an enclosed space, and thus components in the second accommodation space are not subject to external moisture erosion, or are subject to less erosion.

The first drive device 3 is electrically connected to the controller 6. The controller 6 can control the first drive device 3 to operation, which in turn allows the first drive device 3 to control the fan blade 2 to rotate. In an exemplary embodiment, the first drive device 3 may be a motor, such as a brushless motor that can provide a larger air speed, a long service life, and a low noise level. The first drive device 3 may also be a combination of the motor and a reduction mechanism. A power of the motor is transmitted to the fan blade 2 after being reduced by the reduction mechanism, thereby avoiding a danger due to fast rotation of the fan blade 2.

Figure 8:
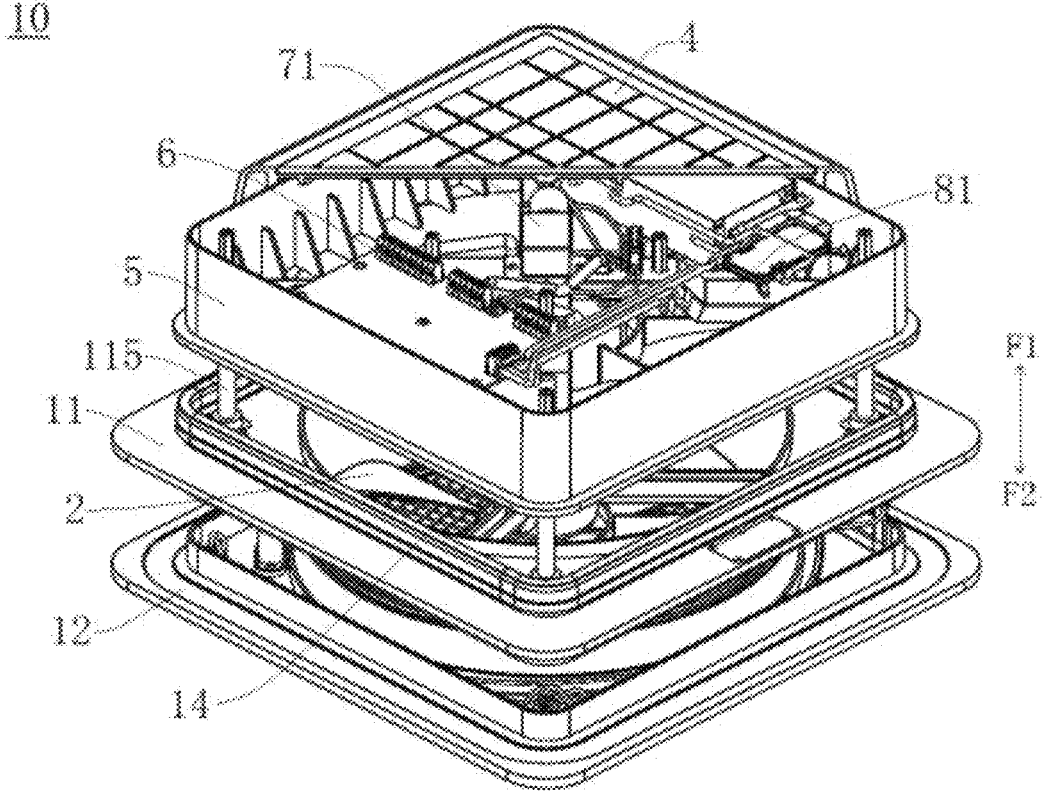
FIG. 8 is a partial cross-sectional view of the ventilator shown in FIG. 6.

In some exemplary embodiments, as shown in FIG. 1 and FIG. 8, the controller 6 is provided in the second accommodation space. In this way, the controller 6 is far away from the vent, and thus the controller 6 would not occupy a space of the vent, such that the vent is larger and an air volume at the vent is larger. Of course, in other embodiments not shown, the controller 6 may also be disposed in the first accommodation space.

Figure 18:
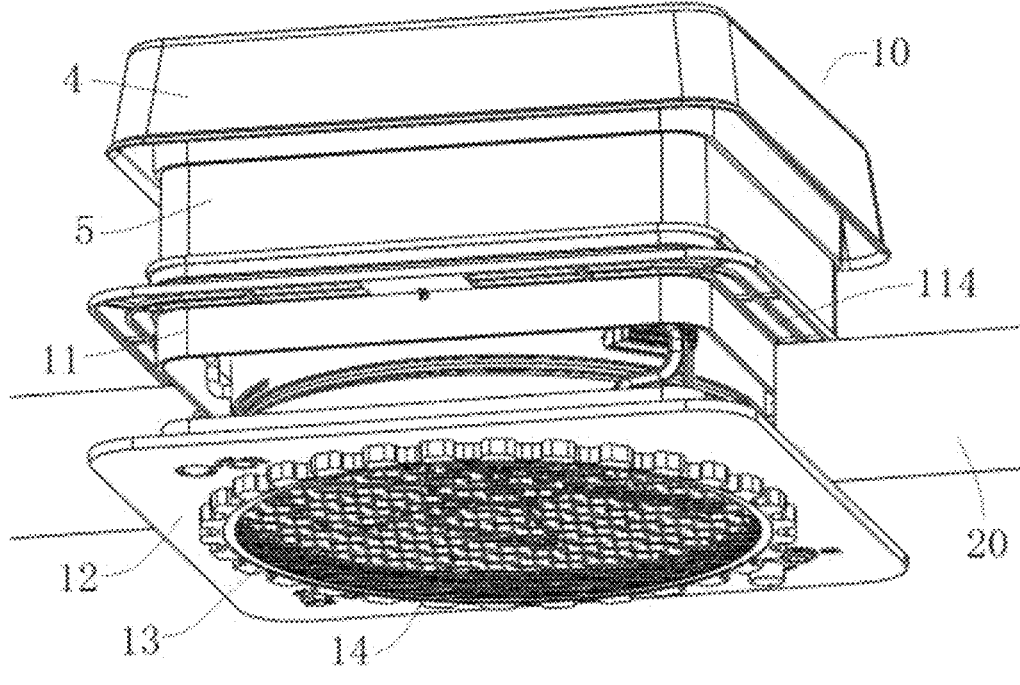
FIG. 18 is a schematic view of a ventilator mounted at a roof of a vehicle according to an embodiment of the present disclosure.

Taking mounting the ventilator 10 at the vehicle as an example, the ventilator 10 may be mounted at a roof 20 of the vehicle. As shown in FIG. 18, the housing assembly 1 is fixed to the roof 20, and the cover plate assembly 4 is located outside the roof 20. When the vent is exposed and the fan blade 2 rotates forwardly, airflow can flow into the vehicle from an exterior of the vehicle, in which case the ventilator 10 can suck air to an interior of the vehicle. When the vent is exposed and the fan blade 2 rotates reversely, airflow can flow from the interior to the exterior of the vehicle, in which case the ventilator 10 can exhaust air to the exterior of the vehicle.

According to the ventilator 10 of the embodiments of the present disclosure, by lifting or lowering the air guide sleeve 5 relative to the housing assembly 1, the vent can be exposed or covered. Such a way of exposing the vent has less influence on an amount of ventilation at the vent, and thus the ventilator 10 has high exhaust efficiency and superior exhaust performance.

Figure 4:
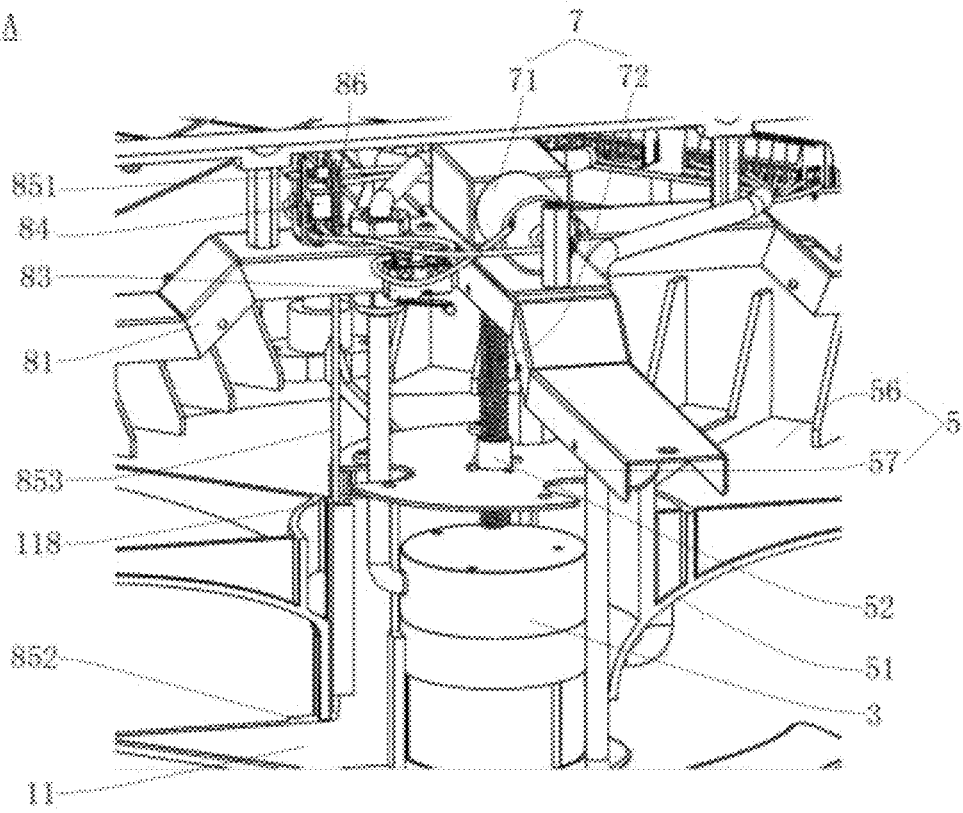
FIG. 4 is a schematic partial enlarged view of part A in FIG. 3.
Figure 5:
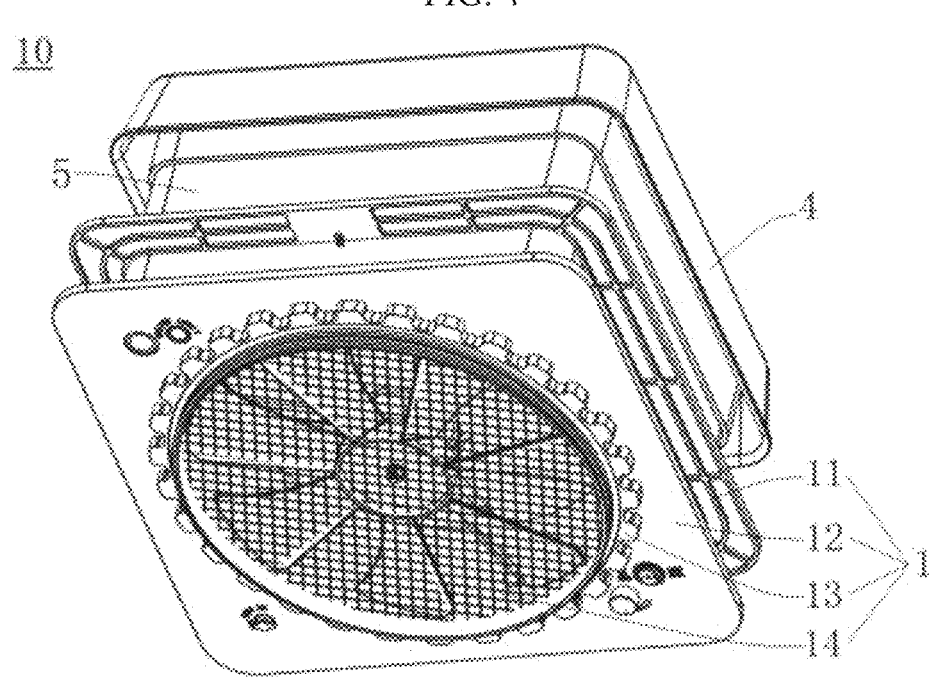
FIG. 5 is a schematic assembly view of a ventilator according to an embodiment of the present disclosure in another direction when a vent is covered.
Figure 7:
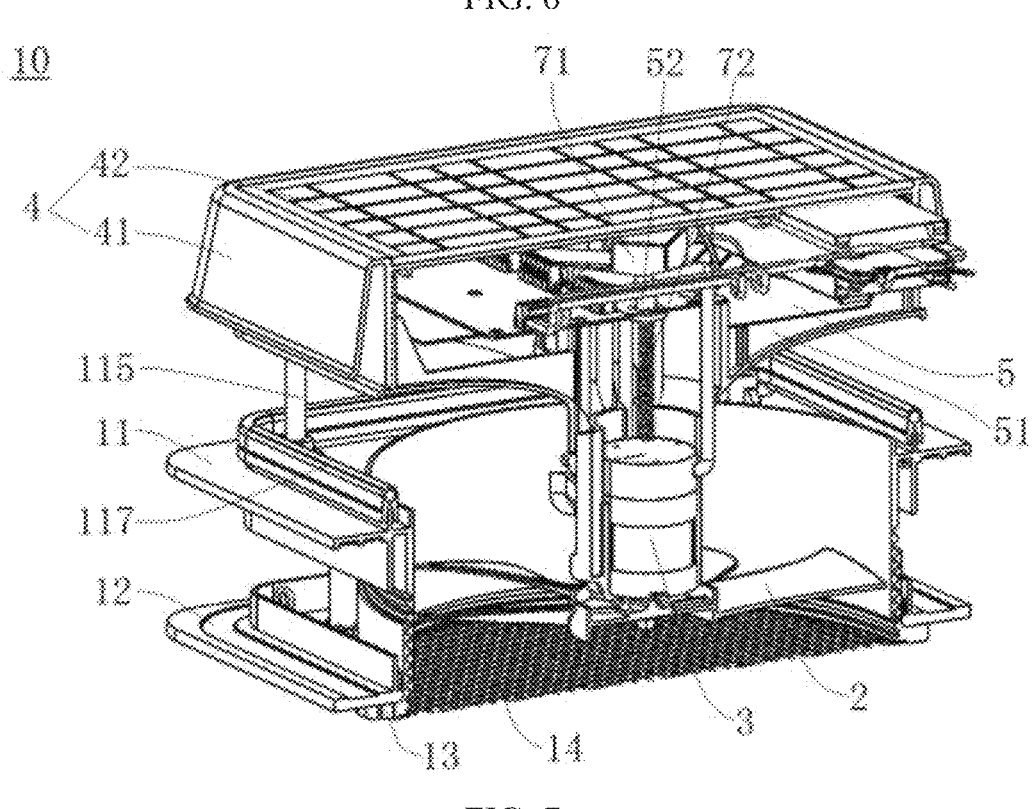
FIG. 7 is a half cross-sectional view of the ventilator shown in FIG. 6.

In some embodiments of the present disclosure, with reference to FIG. 3, FIG. 4, and FIG. 7, the ventilator 10 may further include a second drive device 7 configured to drive the air guide sleeve 5 to lift and lower. The second drive device 7 is electrically connected to the controller 6. The controller 6 can control the second drive device 7 to move, which in turn allows the second drive device 7 to control the air guide sleeve 5 to lift and lower relative to the housing assembly 1.

In some embodiments of the present disclosure, with reference to FIG. 3, FIG. 4, and FIG. 7, the second drive device 7 may include a lifting motor 71 and a screw rod 72. The air guide sleeve 5 is fixedly provided with a nut 52. The lifting motor 71 is provided in the second accommodating space and configured to drive the screw rod 72 to rotate. The nut 52 is screwed with the screw rod 72 to drive the nut 52 to move in an extending direction of the screw rod 72 when the screw rod 72 rotates. In some embodiments, the controller 6 can control the lifting motor 71 to operate. As a result, the lifting motor 71 drives the screw rod 72 to rotate. When the screw rod 72 rotates, the screw rod 72 drives the nut 52 to move in a straight line, and the air guide sleeve 5 moves synchronously with the nut 52, thereby realizing lifting or lowering of the air guide sleeve 5.

The lifting motor 71 may be a gear motor with high reliability and good stability.

In some embodiments not shown, a second drive assembly may also include the lifting motor 71 and a belt transmission mechanism. The belt transmission mechanism includes a driving wheel, a driven wheel, and a belt. The lifting motor 71 is configured to drive the driving wheel to rotate, and the driving wheel can drive the driven wheel to rotate through the belt. In addition, the air guide sleeve 5 is fixedly mounted at the belt. Thus, when the belt rotates around the driving wheel and the driven wheel, the belt can drive the air guide sleeve S to move towards or away from the housing assembly 1.

In some embodiments of the present disclosure, the air guide sleeve 5 has an air guide wall 51 located at an end of the air guide sleeve 5 close to the vent. The air guide wall 51 is constructed into an arc-shaped sectorial structure recessed towards the cover plate assembly 4, and a central part of the air guide wall 51 protrudes towards the vent more than an edge of the air guide wall 51. Referring to FIG. 4, FIG. 7, FIG. 10, and FIG. 11, the arc-shaped sectorial structure is recessed in a direction F1, and the center part of the air guide wall 51 is recessed in a direction F2 more than the edge of the air guide wall 51. A bottom of the air guide sleeve 5 is constructed into an arc-shaped sectorial structure. When the ventilator 10 operates, the arc-shaped sectorial structure can reduce air resistance interference, enabling the ventilator 10 to better exhaust and suck air. In the related art, the ventilator 10 has no air guide sleeve 5, which leads to a chaotic airflow flowing of the ventilator and easily creates interference, which would increase a burden on the ventilator 10. With the air guide sleeve 5, the flowing of the air flow is smoother, and the airflow will follow the arc-shaped sectorial structure of the air guide sleeve 5 to be discharged, which not only reduces a pressure of the ventilator 10 and increases an air volume better, but also reduces unnecessary energy waste and realizes energy saving.

In some embodiments of the present disclosure, referring to FIG. 1 to FIG. 3, and FIG. 5 to FIG. 11, the housing assembly 1 may include a housing body 11, a panel 12, and a protective sleeve 13. In conjunction with FIG. 12 to FIG. 14, the housing body 11 has a body vent 111, and the body vent 111 may extend through the housing body 11 in an axial direction of the housing body 11. The panel 12 has a panel through opening 121, and the panel through opening 121 may extend through the panel 12 in an axial direction of the panel 12. The protective sleeve 13 is located at a side of the housing body 11 facing away from the cover plate assembly 4. That is, the protective sleeve 13 is located at a lower side of the housing body 11. The protective sleeve 13 and the housing body 11 pass through the panel through opening 121 and are connected and fixed to each other. The protective sleeve 13 has a protective vent 131 extending through the protective sleeve 13 in an axial direction of the protective sleeve 13. The protective sleeve 13 is connected to the body vent 111 to form the vent. The air guide sleeve 5 is configured to expose or cover the body vent 111.

Figure 12:
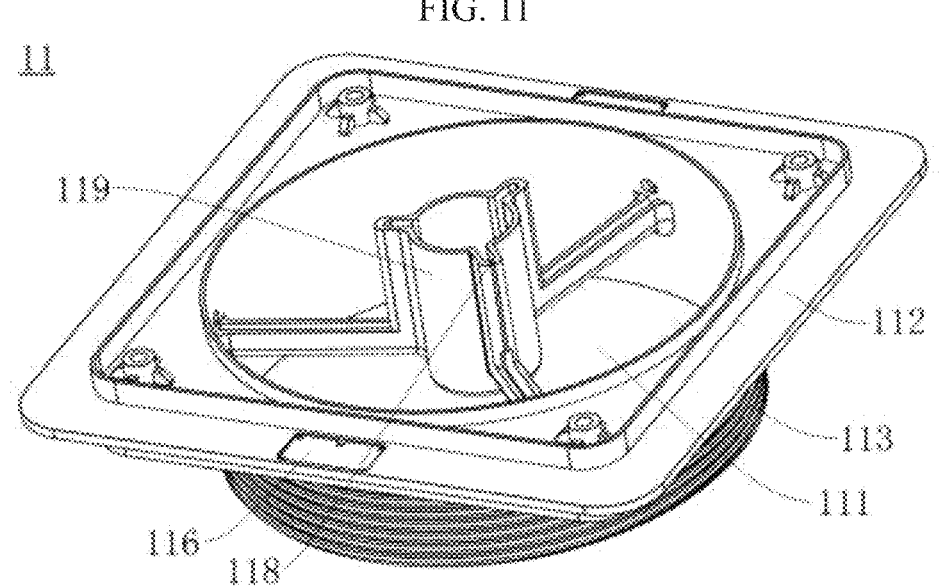
FIG. 12 is a schematic perspective view of the housing body.
Figure 13:
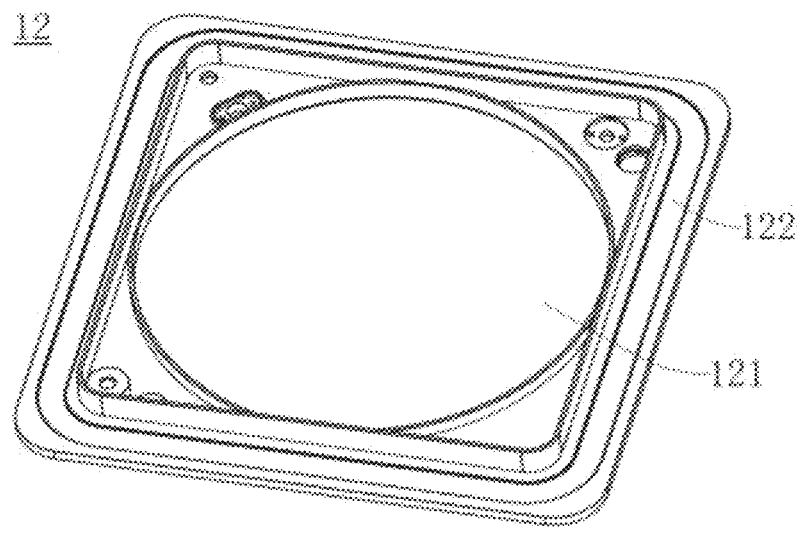
FIG. 13 is a schematic perspective view of a panel.
Figure 14:
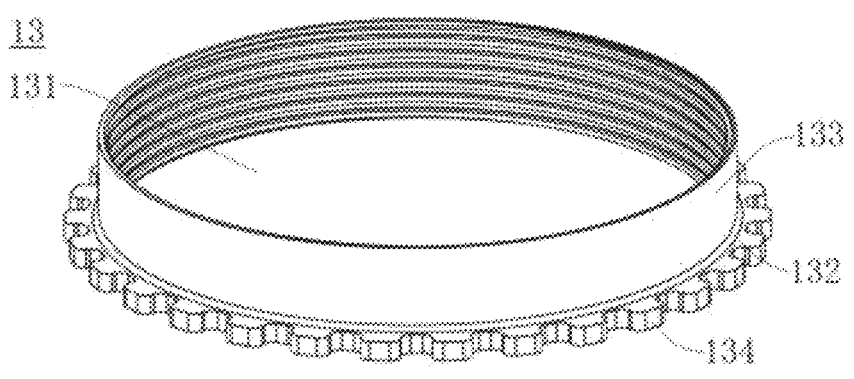
FIG. 14 is a schematic perspective view of a protective sleeve.

Referring to FIG. 12 to FIG. 14, in a plane perpendicular to a direction F1-F2, each of the housing body 11 and the panel 12 may have a quadrangular contour. Each of the body vent 111, the panel through opening 121, and the protective vent 131 may have a circular opening, which is beneficial to simplifying a machining process. In addition, the vent is cylindrical and can be cooperated with the fan blade 2. Each of the housing body 11 and panel 12 has a square contour for easy arrangement of wires.

In some embodiments of the present disclosure, with reference to FIG. 1, FIG. 7, and FIG. 12, the housing body 11 includes a motor compartment 119. The first drive device 3 is mounted in the motor compartment 119. By designing the motor compartment 119 for mounting the first drive device 3, a power cable 93 and a control electrical cable 94 can be wired through a support arm of the motor compartment 119 at a center, which hides the wires and is safe and aesthetically pleasing.

In some embodiments of the present disclosure, with reference to FIG. 1, FIG. 5, and FIG. 12 to FIG. 14, the housing body 11 includes a housing body portion 112 and a body connection cylinder 113 connected to each other. The protective sleeve 13 includes a protective body portion 132 and a protective connection cylinder 133 connected to each other. The body connection cylinder 113 is threadedly connected to the protective connection cylinder 133 for fastening in a sleeved manner. The panel 12 is arranged around the body connection cylinder 113 and the protective connection cylinder 133, and located between the housing body portion 112 and the protective body portion 132. The body connection cylinder 113 and the protective connection cylinder 133 pass through the panel through opening 121. The housing body 11, the panel 12, and the protective sleeve 13 are detachable, which are easy to be cleaned, maintained and eliminates additional screws internally.

Figure 6:
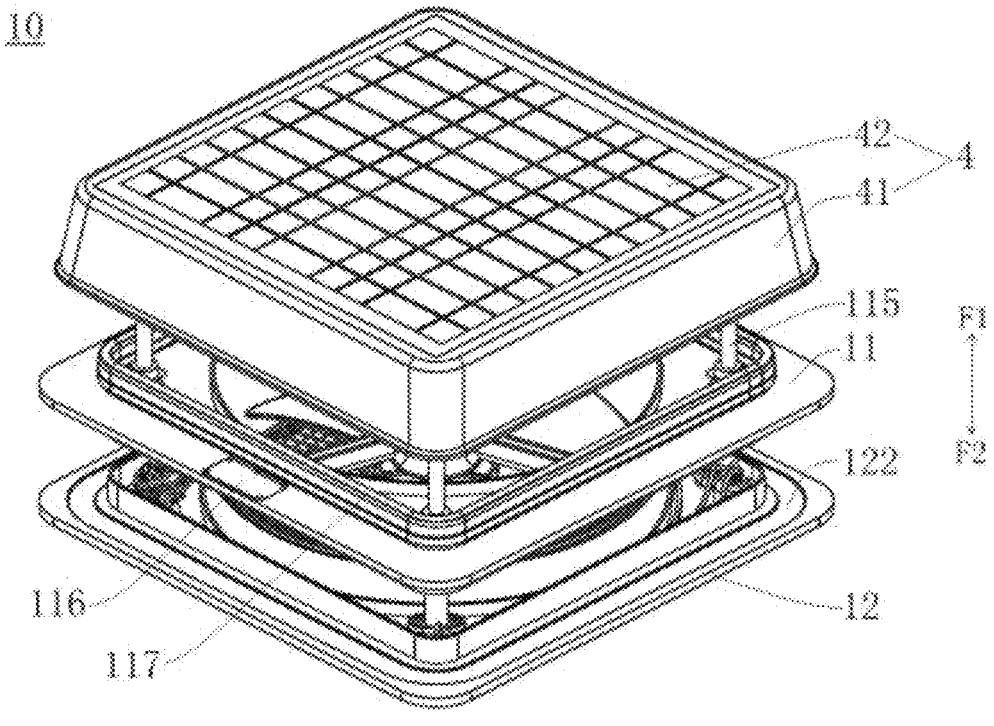
FIG. 6 is a schematic assembly view of a ventilator according to an embodiment of the present disclosure in a direction when a vent is exposed.
Figure 9:
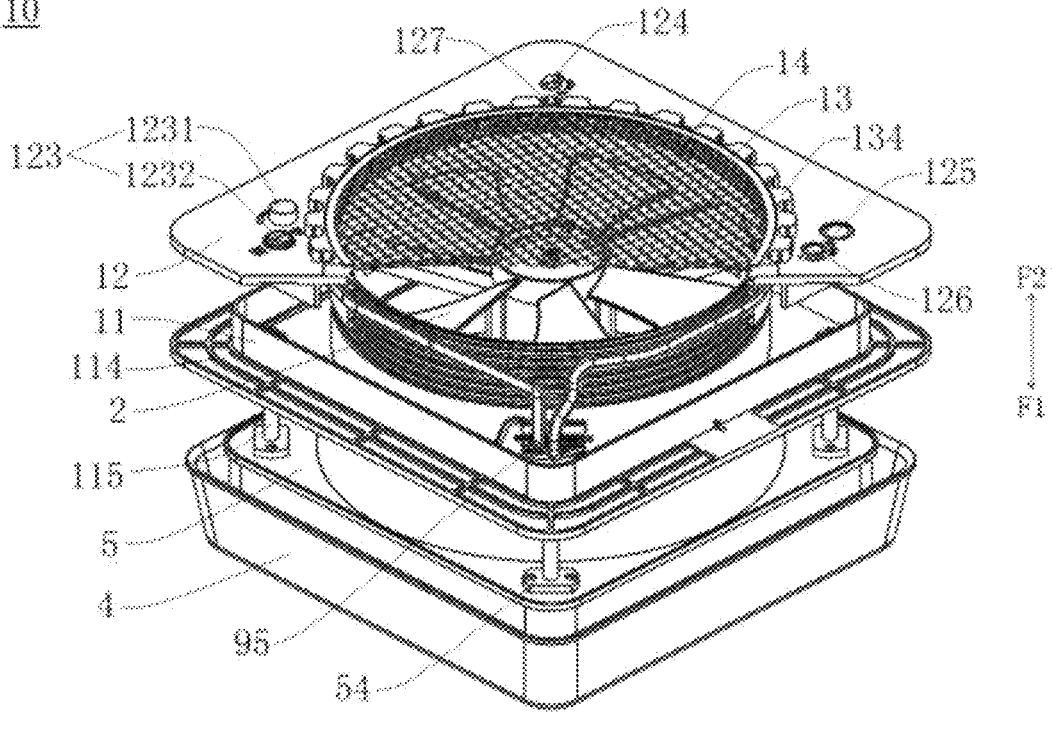
FIG. 9 is a partial cross-sectional view of a ventilator according to an embodiment of the present disclosure in another direction when a vent is exposed.

In some embodiments of the present disclosure, with reference to FIG. 6, FIG. 9, and FIG. 13, a surface of the housing body portion 112 facing towards the panel 12 includes a first mounting surface 114. A surface of the panel 12 facing towards the housing body portion 112 includes a second mounting surface 122. The first mounting surface 114 is spaced apart from the second mounting surface 122. When the ventilator 10 is mounted at the roof 20 of the vehicle, by adjusting a length of a screwing connection between the body connection cylinder 113 and the protective connection cylinder 133, the first mounting surface 114 can be attached with an outer surface of the roof 20, and the second mounting surface 122 can be attached with an inner surface of the roof 20, thereby fixing the ventilator 10 to the roof 20. To improve a waterproof performance of an attachment between the ventilator 10 and the roof 20, waterproof coating may be coated between an outer surface of the first mounting surface 114 and the outer surface of the roof 20. In addition to waterproof effect, the waterproof coating can also increase connection firmness between the ventilator 10 and the roof 20.

In some embodiments of the present disclosure, with reference to FIG. 1, FIG. 3, FIG. 5, FIG. 7, and FIG. 9, the housing assembly 1 may include a permeable protective mesh 14 mounted at the protective sleeve 13 and covering the protective vent 131. The protective sleeve 13 is a support structure for the protective mesh 14, and the protective mesh 14 can provide an anti-mosquito effect to prevent mosquitoes and other insects from entering the interior of the vehicle through the vent. For example, the protective mesh 14 can prevent the ventilator 10 from bringing mosquitoes and insects from an external environment into the interior of the vehicle when the ventilator 10 is in operation. Further, the protective mesh 14 has a predetermined dust-proof effect.

In some embodiments of the present disclosure, with reference to FIG. 8 and FIG. 9, the panel 12 is provided with a control button 123 electrically connected to the controller 6. The control button 123 is configured to at least control the first drive device 3. That is, the control button 123 can control the first drive device 3. Further, the control button 123 can control the second drive device 7.

The control button 123 may include a gear adjustment knob 1231 and a forward-reverse-rotation switch 1232. The gear adjustment knob 1231 is configured to adjust a gear of the first drive device 3, thereby adjusting a rotation speed of the fan blade 2. For example, the gear adjustment knob 1231 may have four gears. At a zero gear, the vent is exposed, and the first drive device 3 and the fan blade 2 stop rotating. In this way, a natural internal and external air exchange is performed. At a first gear, a second gear, and a third gear, the first drive device 3 operates at 30%, 60%, and 100% operating speeds, respectively, to exchange air at two ends of the vent. Of course, the gear adjustment knob 1231 can also have other numbers of gears, such as three gears, five gears, etc. In addition, the gear adjustment knob 1231 may also be a stepless speed adjustment switch to realize a stepless adjustment of the rotation speed of the fan blade 2.

The forward-reverse-rotation switch 1232 is configured to control a forward or reverse rotation of the first drive device 3 to drive the fan blade 2 to exhaust or suck air, thereby ensuring that there is fresh air in an internal space of the vehicle. In an exemplary embodiment, the forward-reverse-rotation switch 1232 may have three gears including a forward-rotation gear, a stop gear, and a reverse-rotation gear. At the forward-rotation gear, the first drive device 3 is controlled to rotate forwardly. At the reverse-rotation gear, the first drive device 3 is controlled to rotate reversely. At the stop gear, the first drive device 3 is controlled to stop rotating, which in turn stops the fan blade 2 rotating. Further, at the stop gear, the second drive device 7 is controlled to drive the air guide sleeve 5 to cover the vent.

In some embodiments of the present disclosure, with reference to FIG. 9, the panel 12 is provided with a light 125 and a light switch 126. The light 125 may be an LED light, which can be used for simple illumination when being turned on. The light switch 126 is configured to turn on or off the light 125. The ventilator 10 further includes an electrical connector 95. Wires may be connected between the controller 6 and the control button 123, between the controller 6 and the first drive device 3, between the controller 6 and the light 125, and between the controller 6 and the light switch 126. The wires are plugged to the electrical connector 95. A plurality of wires may be collected in the electrical connector 95, allowing an internal wiring of the ventilator 10 neat and reducing difficulty of subsequent troubleshooting.

The panel 12 is mounted to the housing body 11 and protective sleeve 13 in a fit manner. One of functions of the panel 12 is to fasten and decorate, and another function of the panel 12 is to collect the wires into the electrical connector and connect the wires with connectors on the power cable 93 and the control electric cable 94 by the electrical connector, thereby connecting to the controller 6 to realize a control on the ventilator 10 system.

In some embodiments of the present disclosure, with reference to FIG. 9 and FIG. 14, the panel 12 is provided with a resilience limiter 127. The protective sleeve 13 is provided with teeth 134 at an outer peripheral wall of the protective sleeve 13. The resilience limiter 127 has a locking state in which the resilience limiter 127 is engaged with the teeth 134 to limit a rotation of the protective sleeve 13 and an unlocking state in which the resilience limiter 127 is disengaged from the teeth 134. A plurality of teeth 134 may be arranged at intervals at the outer peripheral wall of the protective sleeve 13. In this way, the resilience limiter 127 can be easily limited in one of the plurality of teeth 134. As a result, the protective sleeve 13 and housing body 11 can have a variety of screwing connection lengths, and the protective sleeve 13 can be prevented from loosening through the reverse rotation due to vibration after being fastened. The resilience limiter 127 can be caught between two adjacent teeth 134. In some embodiments, the resilience limiter 127 may be embedded within the protective sleeve 13 by a single press to disengage from the teeth 134, and then popped out by another press to engage with the teeth 134.

In some embodiments of the present disclosure, with reference to FIG. 1, FIG. 3, and FIG. 4, the ventilator 10 further includes an auxiliary support 81 located in the second accommodation space and connected and fixed to the housing body 11. The controller 6 is mounted at the auxiliary support 81. The auxiliary support 81 can provides mounting positions for components in the second accommodation space, thus reducing difficulty in mounting components in the second accommodation space and contributing to ensuring that the components are arranged in a neat and organized manner.

In some embodiments of the present disclosure, with reference to FIG. 1, FIG. 3, and FIG. 6 to FIG. 9, the housing body 11 is fixedly provided with a guide post 115. The air guide sleeve 5 is provided with a linear bearing 54. The guide post 115 passes through the linear bearing 54. In this way, the guide post 115 can guide the air guide sleeve 5 when the air guide sleeve 5 is lifted or lowered. The linear bearing 54 can reduce friction between the guide post 115 and the air guide sleeve 5, which enables the lifting or lowering of the air guide sleeve 5 to be smoother. The auxiliary support 81 has a support fixing hole. The ventilator 10 further includes a support stud 82. The support stud 82 has an end passing through the support fixing hole to be screwed to the guide post 115 and another end configured to fix the cover plate assembly 4. In some embodiments, an upper end of the guide post 115 is a threaded hole, and a lower end of the support stud 82 is an external threaded section. In this way, the external threaded section of the support stud 82 is screwed to the threaded hole of the guide post 115, thereby realizing the mounting and fixing of the auxiliary support 81 and the air guide sleeve 5. An upper end of the support stud 82 is a threaded hole, and a bolt is screwed to the threaded hole of the support stud 82 after passing through the cover plate assembly 4. Thus, the cover plate assembly 4 and the auxiliary support 81 can be mounted and fixed. That is to say, one function of the guide post 115 is to serve as a lifting and lowering rail and a limitation of the air guide sleeve 5 to avoid jamming, deviation and falling off during an operation of the air guide sleeve 5. Another function of the guide post 115 is to fix the auxiliary support 81 and the cover plate assembly 4. The guide post 115 is used as a main rod connecting an upper part and a lower part, which can not only increase the firmness of a whole ventilator 10, but also improve lifting or lowering stability of the air guide sleeve 5.

In an exemplary embodiment, the air guide sleeve 5 is an optical shaft, and one, two or more guide posts 115 may be provided. The support stud 82 corresponds to the guide post 115 in one-to-one correspondence. The number of the linear bearings 54 may be equal to or less than that of the guide posts 115.

In some embodiments of the present disclosure, with reference to FIG. 3 and FIG. 4, the ventilator 10 further includes a first limit switch 83, a second limit switch 84, a limit lever 85, and a restoring spring 86. The first limit switch 83 and the second limit switch 84 are both mounted at the auxiliary support 81. Further, the first limit switch 83 and the second limit switch 84 are both electrically connected to the controller 6 and the lifting motor 71 for driving the air guide sleeve 5 to lift or lower. In this way, signals collected by the first limit switch 83 and the second limit switch 84 can be transmitted to the controller 6. The first limit switch 83 has a contact facing towards the air guide sleeve 5. Further, the contact of the first limit switch 83 is configured to detect a position at which the air guide sleeve 5 is furthest from the vent to allow the air guide sleeve 5 to expose the vent to generate an air duct opened state. The second limit switch 84 has a contact facing away from the air guide sleeve 5. The restoring spring 86 is configured to exert an elastic force on the limit lever 85 to restore the limit lever 85 to its initial position. The air guide sleeve 5 can move towards the vent to be in contact with the limit lever 85 and further drive the limit lever 85 to move, activating the contact of the second limit switch 84 by the limit lever 85 to detect a position at which the air guide sleeve 5 is nearest to the vent to allow the air guide sleeve 5 to cover the vent to generate an air duct closed state. The first limit switch 83 is an upper limit switch configured to limit an upper limit position of the air guide sleeve 5, and the second limit switch 84 is a lower limit switch configured to limit a lower limit position of the air guide sleeve 5.

Figure 17:
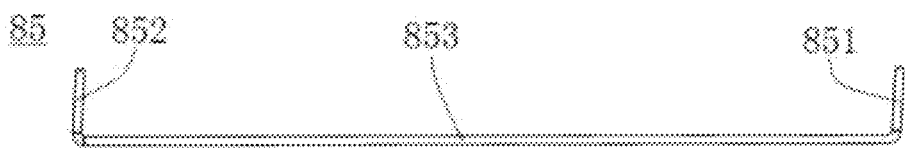
FIG. 17 is a schematic view of a limit lever.

In some embodiments of the present disclosure, referring to FIG. 4 and FIG. 17, the limit lever 85 may include a lever first arm 851, a lever second arm 852 and a lever connection arm 853. The lever connection arm 853 connects the lever first arm 851 and the lever second arm 852. The lever first arm 851 is located at a side of the contact of the second limit switch 84 facing away from the air guide sleeve 5. The lever connection arm 853 passes through the air guide sleeve 5. The lever second arm 852 is located at a side of the air guide sleeve 5 facing away from the second limit switch 84. The restoring spring 86 can tension the lever connection arm 853. The air guide sleeve 5 moves towards the vent to be in contact with the lever second arm 852 and further drives the limit lever 85 to move, activating the contact of the second limit switch 84 by the lever first arm 851 to detect the position at which the air guide sleeve 5 is nearest to the vent.

Referring to FIG. 4 and FIG. 17, the housing body 11 has a lever hole 118 through which the lever connection arm 853 can pass.

In an exemplary embodiment, the auxiliary support 81 may be a plastic support or a metal support. One function of the auxiliary support 81 is to provide support for component placement, mainly for placing the controller 6, the lifting motor 71, the first limit switch 83, the second limit switch 84, or the like. Another function of the auxiliary support 81 is to be connected to the housing body 11 and to the cover plate assembly 4 by support stud 82, enabling that the whole ventilator 10 forms a complete structure and increases strength. With such a design, the controller 6, the lifting motor 71, the first limit switch 83, and the second limit switch 84 can be contained in the second accommodation space between the air guide sleeve 5 and the cover plate assembly 4. No matter whether the vent is exposed or covered, the components inside the second accommodation space cannot be visible, which is beneficial to increasing aesthetics and safety of the ventilator 10 and avoiding the components inside the second accommodation space from being easily damaged due to touch. Rainwater erosion can also be avoided, and service life can be prolonged.

Figure 10:
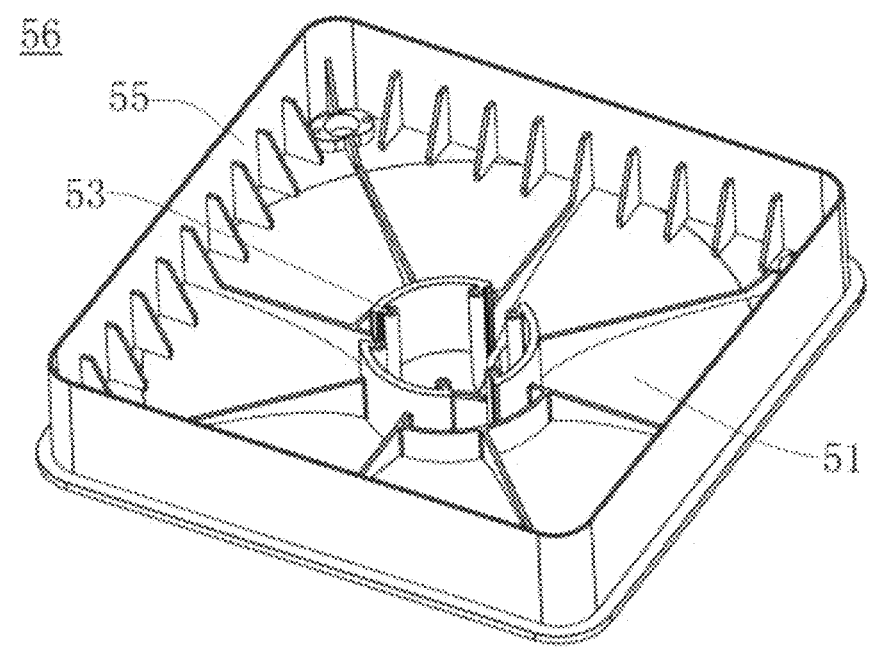
FIG. 10 is a schematic perspective view of an air guide sleeve body.
Figure 11:
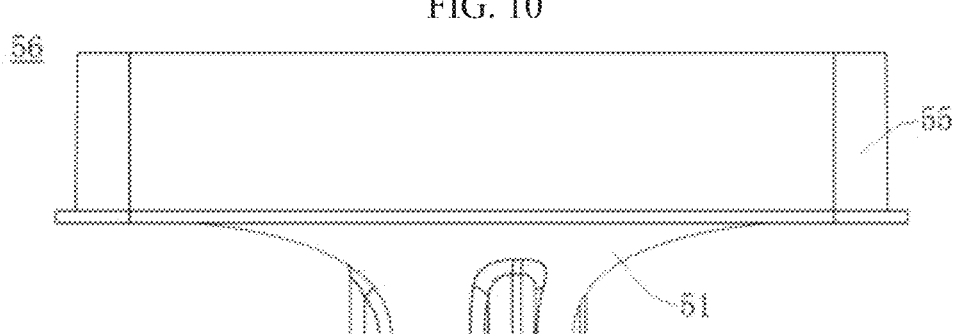
FIG. 11 is a front view of an air guide sleeve body.

Referring to FIG. 3, FIG. 4, and FIG. 10, the air guide sleeve 5 includes an air guide sleeve body 56 and an air guide sleeve cover sheet 57. The air guide sleeve body 56 has a mounting hole 53. The air guide sleeve cover sheet 57 is fastened at the mounting hole 53 by a fastener. The nut 52 is fixed at the air guide sleeve cover sheet 57.

In some embodiments of the present disclosure, referring to FIG. 1, FIG. 6, and FIG. 12, the ventilator 10 further includes a rainwater sensor 116 mounted at the housing body 11 and electrically connected to the controller 6. The rainwater sensor 116 is configured to detect rainwater. Rainwater signals detected by the rainwater sensor 116 can be transmitted to the controller 6. The rainwater sensor 116 is configured to control, when rainwater water is detected by the rainwater sensor 116, the air guide sleeve 5 to lower to cover the vent.

The rainwater sensor 116 may be two separate conductors, and the two conductors are respectively connected to one electrode of a power supply. When rainwater falls between the two conductors and is in contact with the two conductors, the two conductors are conducted, thereby detecting that there is rainwater. In an exemplary embodiment, the conductor may be pure aluminum or pure copper, and may be two contacts on a PCB circuit board. Of course, the conductor may also be replaced by other devices capable of realizing a rainwater detection function as desired.

The rainwater sensor 116 can transmit the rainwater signals to the controller 6, and the controller 6 controls the lifting motor 71 to rotate to drive the air guide sleeve 5 to lower by the screw rod 72 and the nut 52, thereby covering the vent. The rainwater sensor 116 may be connected to the power cable 93 and the control electric cable 94 to sense whether it is raining outside and determine whether to lift or lower the air guide sleeve S.

In an exemplary embodiment, one or more rainwater sensors 116 may be provided.

For example, two rainwater sensors 116 may be provided.

In some embodiments of the present disclosure, referring to FIG. 1 to FIG. 3 and FIG. 6 to FIG. 8, the cover plate assembly 4 may include a cover body 41 and a photovoltaic panel 42. The photovoltaic panel 42 is mounted at a side of the cover body 41 facing away from the housing body 11. The second accommodation space is formed between the cover body 41 and the air guide sleeve 5. The photovoltaic panel 42 is electrically connected to the controller 6. The photovoltaic panel 42 is a solar photovoltaic panel. In this way, the photovoltaic panel 42 can absorb solar energy during the day and convert the solar energy into electrical energy for use by electrical components of the ventilator 10. In this way, the ventilator 10 will not use electrical energy from the vehicle.

In an exemplary embodiment, the photovoltaic panel 42 may be bonded to an outer side of the cover body 41 by an adhesive or fixedly mounted to the outer side of the cover body 41 by a fastener.

In some embodiments of the present disclosure, the photovoltaic panel 42 has a conventional glass structure. In this way, the photovoltaic panel 42 has a strong load bearing capacity, a strong structure, a hard texture, and a longer service life.

Figure 15:
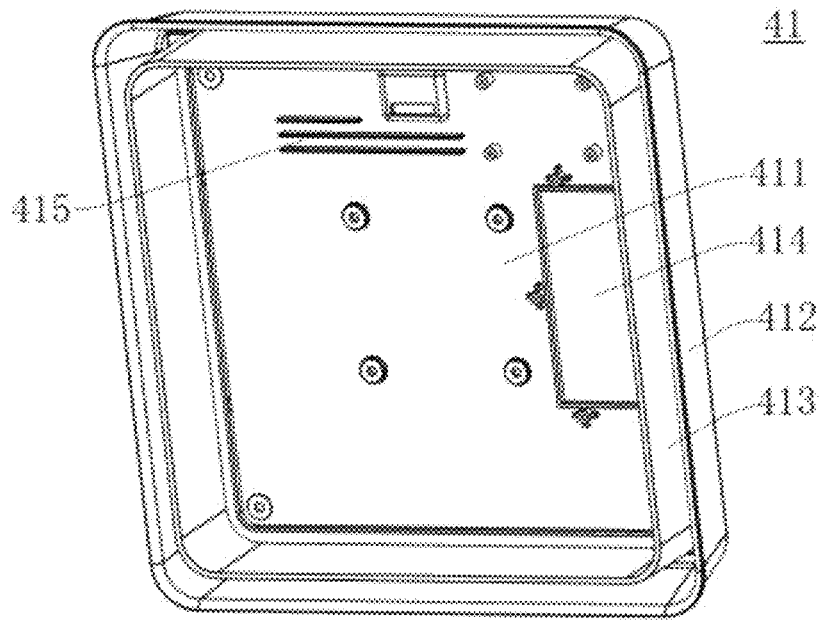
FIG. 15 is a schematic perspective view of a cover body.
Figure 16:
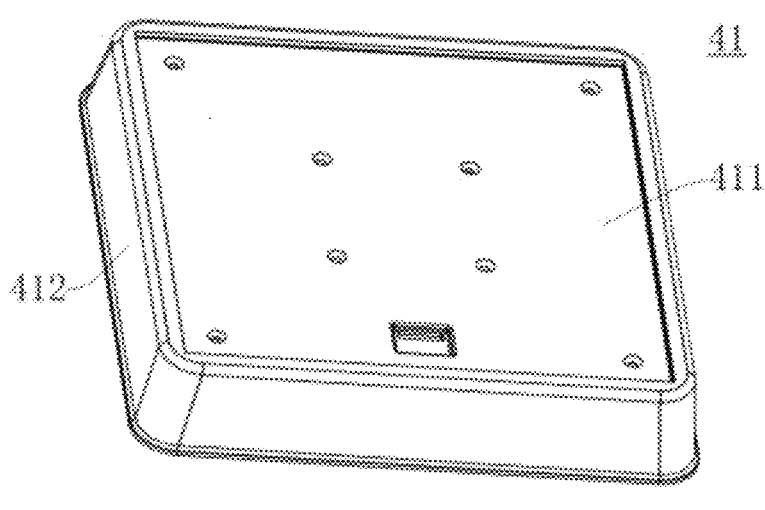
FIG. 16 is another schematic perspective view of a cover body.

Referring to FIG. 15 and FIG. 16, the cover body 41 has a cover top wall 411, a cover outer side wall 412, and a cover inner side wall 413. Each of the cover outer side wall 412 and the cover inner side wall 413 is connected to the cover top wall 411. The cover outer side wall 412 surrounds around the cover inner side wall 413. The cover outer side wall 412 is spaced apart from the cover inner side wall 413. The air guide sleeve 5 includes an air guide sleeve side wall 55 arranged inside the cover inner side wall 413. When the air guide sleeve 5 is lifted or lowered, the air guide sleeve side wall 55 moves along the cover inner side wall 413.

The photovoltaic panel 42 may be disposed at the cover top wall 411. Referring to FIG. 1 and FIG. 16, the cover top wall 411 may have a recess, and the photovoltaic panel 42 may be disposed in the recess, thereby reducing a total height of the cover plate assembly 4 and enabling the overall structure of the ventilator 10 compact.

In some embodiments of the present disclosure, as shown in FIG. 1, the ventilator 10 may further include a storage battery 91. The storage battery 91 is provided in the second accommodation space and electrically connected to the photovoltaic panel 42. The photovoltaic panel 42 and the storage battery 91 may be electrically connected by a photovoltaic power cord 92.

The storage battery 91 contains a battery management system (BMS) to protect charging or discharging of the storage battery 91 to avoid damage to the storage battery 91 due to overcharge or overdischarge. In an exemplary embodiment, the storage battery 91 may be a lithium battery or a lead-acid battery. The storage battery 91 may be mount at the cover body 41. Referring to FIG. 15, an inner side surface of the cover body 41 is provided with a battery mounting position 414, and the storage battery 91 is mounted at the battery mounting position 414.

The inner side surface of the cover body 41 is further provided with a wire routing groove 415, and the photovoltaic power cord 92 is fixed at the wire routing groove 415, enabling that a wiring harness is tidy.

When a power supply quantity of the ventilator 10 is lower than a predetermined threshold, the first drive device 3 stops rotating and the air guide sleeve 5 covers the vent, thereby preventing the air guide sleeve 5 from being unable to cover the vent due to insufficient power level of the ventilator 10, which may allow rainwater, sundries and the like to enter the vehicle through the vent.

In some embodiments, the controller 6 is configured to control the first drive device 3 to stop rotating and control the air guide sleeve 5 to lower to cover the vent when the power level of the storage battery 91 is lower than a first predetermined threshold.

In some embodiments of the present disclosure, as shown in FIG. 9, the panel 12 is provided with an external power interface 124 electrically connected to the controller 6. When there is no sunlight for a long time, the solar photovoltaic panel 42 cannot supply power to the ventilator 10. It happens that the storage battery 91 is also out of power, then it is possible to connect the panel 12 to the vehicle power supply system through the external power interface 124 for emergency use.

In other embodiments, the controller 6 is configured to control the first drive device 3 to stop rotating and control the air guide sleeve 5 to lower to cover the vent when a power level of an external power source to which the external power interface 124 is connected is lower than a second predetermined threshold. The second predetermined threshold and the first predetermined threshold may be equal to or different from each other.

The fan blade 2 is configured to: drive, when rotating about the rotational axis of the fan blade 2 in a first direction, airflow in the vent to flow from the cover plate assembly 4 to the housing assembly 1; and drive, when rotating about the rotational axis of the fan blade 2 in a direction opposite to the first direction, airflow in the vent to flow from the housing assembly 1 to the cover plate assembly 4.

As shown in FIG. 18, taking mounting the ventilator 10 at the roof 20 of the vehicle as an example, the housing assembly 1 is fixed to the roof 20, and the cover plate assembly 4 is located at an outer side of the roof 20. When the vent is exposed and the fan blade 2 rotates about the rotational axis of the fan blade 2 in the first direction, the airflow can flow from the exterior into the interior of the vehicle. In this case, the ventilator 10 can suck air inwardly. When the vent is exposed and the fan blade 2 rotates about the rotational axis of the fan blade 2 in a direction opposite to the first direction, the airflow can flow from the interior to the exterior of the vehicle. The ventilator 10 can exhaust air outwards.

In some embodiments of the present disclosure, referring to FIGS. 6 and FIG. 7, an end of the body vent 111 facing towards the air guide sleeve 5 is provided with a seal ring 117. The seal ring 117 is a waterproof seal ring 117 of a whole circular ring shape, thus sealing the vent in all directions. When the air guide sleeve 5 is lowered to a predetermined position, at this position, the air guide sleeve 5 compresses the waterproof seal ring 117 to form a closed space to avoid water ingress. The air guide sleeve 5 has a square design to better press fit with the square waterproof seal ring 117 on the housing body 11 during closing.

When the forward-reverse-rotation switch 1232 is switched on, the lifting motor 71 will drive the air guide sleeve 5 to lift or lower. Since the linear bearing 54 on the air guide sleeve 5 is arranged around the guide post 115, the air guide sleeve can be lifted smoothly without deviation and jamming. When the air guide sleeve 5 is lifted to a predetermined height, the first limit switch 83 will be activated by the air guide sleeve 5, and the air guide sleeve 5 will stop lifting and expose the whole vent. As a result, the ventilator 10 can perform the air exchange. Similarly, when the forward-reverse-rotation switch 1232 is switched off, the air guide sleeve 5 will be lowered. When the air guide sleeve 5 is lowered to the predetermined position, the limit lever 85 will be activated by the air guide sleeve 5. The limit lever 85 will drive the restoring spring 86 and is pressed against the second limit switch 84. The air guide sleeve 5 will stop lowering and cover the whole vent. In this case, the air guide sleeve 5 will compress the waterproof seal ring 117 to ensure that there is no risk of water ingress.

An exemplary embodiment of the ventilator 10 of the present disclosure will be described below.

The ventilator 10 includes a housing assembly 1, a fan blade 2, a first drive device 3, a cover plate assembly 4, an air guide sleeve 5, and a controller 6. The housing assembly 1 includes a housing body 11, a panel 12, and a protective sleeve 13. The housing body 11 has a body vent 111. The body vent 111 extends through the housing body 11 in an axial direction of the housing body 11. The panel 12 has a panel through opening 121, and the panel through opening 121 extends through the panel 12 in an axial direction of the panel 12. The protective sleeve 13 is located at a lower side of the housing body 11. The housing body 11 includes a housing body portion 112 and a body connection cylinder 113 connected to each other. The protective sleeve 13 includes a protective body portion 132 and a protective connection cylinder 133 connected to each other. The body connection cylinder 113 is threadedly connected to the protective connection cylinder 133 in a sleeved manner. The panel 12 is arranged around the body connection cylinder 113 and the protective connection cylinder 133. The body connection cylinder 113 and the protective connection cylinder 133 pass through the panel through opening 121. The protective sleeve 13 has a protective vent 131. The protective vent 131 extends through the protective sleeve 13 in an axial direction of the protective sleeve 13. The protective vent 131 is connected to the body vent 111 to form the vent, and a permeable protective mesh 14 is mounted at the protective sleeve 13. The protective mesh 14 covers the protective vent 131.

A surface of the housing body portion 112 facing towards the panel 12 includes a first mounting surface 114. A surface of the panel 12 facing towards the housing body portion 112 includes a second mounting surface 122. The first mounting surface 114 is spaced apart from the second mounting surface 122. When the ventilator 10 is mounted at a roof 20 of the vehicle, by adjusting a length of a screwing connection between the body connection cylinder 113 and the protective connection cylinder 133, the first mounting surface 114 is attached with an outer surface of the roof 20, and the second mounting surface 122 is attached with the inner surface of the roof 20, thereby fixing the panel 12 to the roof 20 and the ventilator 10 to the roof 20. As shown in FIG. 18, a waterproof coating is coated between the first mounting surface 114 and the outer surface of the roof 20. The panel 12 is provided with a gear adjustment knob 1231, a forward-reverse-rotation switch 1232, an electrical connector 95, a light 125, a switch 126, a resilience limiter 127, and an external power interface 124. The external power interface 124 is electrically connected to the controller 6, and the protective sleeve 13 is provided with teeth 134 at an outer peripheral wall of the protective sleeve 13. The resilience limiter 127 can lock a position of the protective sleeve 13 and prevent the protective sleeve 13 from rotating.

The first drive device 3 is a brushless motor. The first drive device 3 is electrically connected to the controller 6 and configured to drive the fan blade 2 to rotate about the rotation axis of the fan blade 2 forwardly or reverse.

The cover plate assembly 4 is disposed at an upper side of housing assembly 1.

The cover plate assembly 4 includes a cover body 41 and a solar photovoltaic panel 42 bonded to the outer side of the cover body 41 by an adhesive.

The second accommodation space is formed between the air guide sleeve 5 and the cover plate assembly 4. An auxiliary support 81 and a storage battery 91 are arranged in the second accommodation space. The solar photovoltaic panel 42 is electrically connected to the storage battery 91. The controller 6, the lifting motor 71, the first limit switch 83, and the second limit switch 84 are disposed on the auxiliary support 81. The lifting motor 71 is configured to drive a screw rod 72 to rotate. A nut 52 is fixedly arranged at the air guide sleeve 5 and screwed to the screw rod 72. In this way, when the screw rod 72 rotates, the nut 52 is driven to move in an extending direction of the screw rod 72, and the air guide sleeve 5 moves synchronously with the nut 52, thereby realizing the lifting or lowering of the air guide sleeve 5. A bottom of the air guide sleeve 5 is the air guide wall 51 constructed into an arc-shaped sectorial structure. The arc-shaped sectorial structure is recessed towards F1, and a center part of the air guide wall 51 is recessed towards F2 more than the edge of the air guide wall 51. An end of the body vent 111 facing towards the air guide sleeve 5 is provided with a seal ring 117. The first limit switch 83 is configured to limit an upper limit position of the air guide sleeve 5, and the second limit switch 84 cooperating with the limit lever 85 and the restoring spring 86 is configured to limit a lower limit position of the air guide sleeve 5. A power supply system is mainly provided by the solar photovoltaic panel 42 and the storage battery 91, with external power interface 124 reserved for additional options.

A rainwater sensor 116 is provided at an upper surface of the housing body 11, and electrically connected to the controller 6. When rainwater has been detected by the rainwater sensor 116, the controller 6 controls the lifting motor 71 to drive the air guide sleeve 5 to lower, thereby covering the vent.

Four guide posts 115 are fixedly arranged at the housing body 11, and four linear bearings 54 are arranged at the air guide sleeve 5. The support stud 82 has an end passing through the support fixing hole on the auxiliary support 81 to be screwed to the corresponding guide post 115, and then a bolt passes through the cover plate assembly 4 and screwed to the support stud 82.

As a main frame of the ventilator 10, the housing body 11 functions to connect the upper part and the lower part. The air guide sleeve 5 and the cover plate assembly 4 are located above the housing body 11. The panel 12 and protective sleeve 13 are located below the housing body 11. At an upper part of the housing body 11 passes through the air guide sleeve 5 with the linear bearing 54 through the guide post 115 and is fixed to the support stud 82 on the auxiliary support 81. The cover body 41 is fixedly connected to the support stud 82 through screws, and the solar photovoltaic panel 42 is fixed on a top of the cover body 41 through adhesive. At a lower part of the housing body 11, the brushless motor is mounted at the motor compartment 119 in the center of the housing body 11. The fan blade 2 of the ventilator 10 is fixed at a motor shaft of the brushless motor. The panel 12 is connected to a power cable and a wire control electric cable 94 extending from the controller 6 of the upper part of the he housing body 11. In this way, a control key of the panel 12 can control the operation of the whole ventilator 10.

The controller 6 is a control center of the whole ventilator 10, and connected to the brushless motor, the lifting motor 71, the power cable 93, the control electric cable 94, the photoelectric power cord 92, the storage battery 91, and the rainwater sensor 116, respectively.

The controller 6 can control a speed of the fan blade 2, an exposing or covering of the vent, and a detection of rainwater. The controller 6 may have a wireless connection function and may be connected with a mobile phone APP to realize wireless remote operation within a certain range.

In the related art, most ventilators 10 are mainly composed of three parts including a motor, a fan blade 2, and a housing body 11, and power supply, mosquito prevention and waterproof properties are not considered. According to the ventilator 10 of the present disclosure, three kinds of power supply can be realized by arranging the solar photo-voltaic panel 42, the storage battery 91, and the external power interface 124. Mosquito prevention can be realized by arranging the protective mesh 14, and waterproof can be realized by arranging waterproof coating on the first mount-ing surface 114. The ventilator 10 of the present disclosure is integrally formed and is convenient to be disassembled, mounted, and transported.

Referring to FIG. 18, a vehicle according to embodiments of the present disclosure includes the ventilator 10 as described in the above embodiments. The ventilator 10 is mounted at a roof 20 of the vehicle, and the cover plate assembly 4 is located outside the roof 20. The ventilator 10 is fixed on the roof 20 of the vehicle by using silicone structural adhesive externally, and the whole ventilator 10 is tensioned internally by using the panel 12 and protective sleeve 13. Therefore, the first mounting surface 114 is attached to the outer surface of the loft 20, and the second mounting surface 122 is attached to the inner surface of the loft 20. The silicone structural adhesive is coated between the first mounting surface 114 and the outer surface of the loft 20. After practical testing, this method can withstand at least 3000 N external force, and turbulence caused by vehicle driving or the inertia force caused by sudden braking will not loosen the ventilator 10. The ventilator 10 according to the embodiments of the present disclosure has good installability and maintainability, a stable and reliable struc-ture, a long service life and a good use effect. Since a screwing length of the protective sleeve 13 and the housing body 11 can be adjusted, a distance between the second mounting surface 122 and the first mounting surface 114 can be adjusted, which enables that the roof 20 with different thicknesses can be adapted, and the versatility and adapt-ability of the ventilator 10 can be improved.

In some embodiments of the present disclosure, the vehicle may be a recreational vehicle.

With the vehicle according to the embodiments of the present disclosure, the ventilator 10 can be exposed or covered by lifting and lowering the air guide sleeve 5 relative to the housing assembly 1. Such a way of exposing the vent has less influence on an amount of ventilation at the vent, and thus the ventilator 10 has high exhaust efficiency and superior exhaust performance. Therefore, better air exchange between an interior of the vehicle and an exterior of the vehicle can be realized.

In descriptions of the present disclosure, it should be understood that the orientation or the position indicated by terms such as "longitudinal", "lateral", "length", "width", "thickness", "over", "below", "front", "rear", "left", "right", "vertical", "horizontal", "top", "bottom", "inner", and "outer" should be construed to refer to the orientation and the position as shown in the drawings in discussion, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

In the present disclosure, unless otherwise clearly speci-fied and limited, terms such as "install", "connect", "connect to", "fix" and the like should be understood in a broad sense. For example, it may be a fixed connection or a detachable connection or connection as one piece; mechanical connec-tion or electrical connection or communicate with each other; direct connection or indirect connection through an intermediate; internal communication of two components or the interaction relationship between two components, unless otherwise clearly limited. For those skilled in the art, the specific meaning of the above-mentioned terms in the pres-ent disclosure can be understood according to specific circumstances.

In descriptions of the present disclosure, descriptions with reference to the terms "an embodiment", "some embodi-ments", "examples", "specific examples", or "some examples" etc., mean that specific features, structure, mate-rials, or characteristics described in conjunction with the embodiment or example are included in at least one embodi-ment or example of the present disclosure. In this specifi-cation, the schematic representations of the above terms do not necessarily refer to the same embodiment or example. Moreover, the described specific features, structures, mate-rials or characteristics may be combined in any one or more embodiments or examples in a suitable manner.

Although embodiments of the present disclosure have been shown and described above, it should be understood that the above embodiments are merely exemplary, and cannot be construed as limitations of the present disclosure. For those skilled in the art, changes, alternatives, and modifications can be made to the above embodiments with-out departing from the scope of the present disclosure.

What is claimed is:

1. A ventilator, comprising:
   a housing assembly internally having a first accommoda-tion space, the housing assembly having a vent;
   a fan blade mounted in the first accommodation space;
   a first drive device mounted in the first accommodation space and configured to drive the fan blade to rotate about a rotation axis of the fan blade;
   a cover plate assembly provided at a side of the housing assembly;
   an air guide sleeve provided between the cover plate assembly and the housing assembly, the air guide sleeve being configured to be lifted or lowered relative to the housing assembly to expose or cover the vent, a second accommodation space being defined by the air guide sleeve and the cover plate assembly; and
   a controller electrically connected to the first drive device, wherein the housing assembly comprises:
      a housing body having a body vent;
      a panel having a panel through opening; and
      a protective sleeve located at a side of the housing body facing away from the cover plate assembly,
   wherein the protective sleeve and the housing body pass through the panel through opening and are connected and fixed to each other;
   wherein the protective sleeve has a protective vent con-nected to the body vent to form the vent; and
   wherein the air guide sleeve is configured to expose or cover the body vent.

2. The ventilator according to claim 1, further comprising a second drive device electrically connected to the controller and configured to drive the air guide sleeve to lift and lower.

3. The ventilator according to claim 2, wherein the second drive device comprises a lifting motor and a screw;
   the air guide sleeve is fixedly provided with a nut;
   the lifting motor is disposed in the second accommodating space and configured to drive the screw to rotate; and
   the nut is screwed with the screw to drive the nut to move in an extending direction of the screw when the screw rotates.

4. The ventilator according to claim 1, wherein the air guide sleeve has an air guide wall located at an end of the air guide sleeve close to the vent, the air guide wall being constructed into an arc-shaped sectorial structure recessed towards the cover plate assembly, and a central part of the air guide wall protruding towards the vent more than an edge of the air guide wall.

5. The ventilator according to claim 1, wherein the housing body comprises a housing body portion and a body connection cylinder connected to each other;

the protective sleeve comprises a protective body portion and a protective connection cylinder connected to each other;

the body connection cylinder is threadedly connected to the protective connection cylinder in a sleeved manner; and the panel is arranged around the body connection cylinder and the protective connection cylinder, and located between the housing body portion and the protective body portion.

6. The ventilator according to claim 5, wherein a surface of the housing body portion facing towards the panel comprises a first mounting surface; and a surface of the panel facing towards the housing body portion comprises a second mounting surface, wherein the first mounting surface is spaced apart from the second mounting surface.

7. The ventilator according to claim 1, wherein the housing assembly comprises a permeable protective mesh mounted at the protective sleeve and covering the protective vent.

8. The ventilator according to claim 1, wherein the panel is provided with a control button, a light, and a light switch configured to turn on or off the light, the control button being configured to at least control the first drive device;

the ventilator further comprises an electrical connector;

wires are connected between the controller and the control button, between the controller and the first drive device, between the controller and the light, and between the controller and the light switch, the wires being plugged to the electrical connector.

9. The ventilator according to claim 1, wherein the panel is provided with a resilience limiter;

the protective sleeve is provided with teeth at an outer peripheral wall of the protective sleeve;

the resilience limiter has a locking state in which the resilience limiter is engaged with the teeth to limit a rotation of the protective sleeve and an unlocking state in which the resilience limiter is disengaged from the teeth.

10. The ventilator according to claim 1, further comprising an auxiliary support located in the second accommodation space and connected and fixed to the housing body, the controller being mounted at the auxiliary support.

11. The ventilator according to claim 10, wherein the housing body is fixedly provided with a guide post;

the air guide sleeve is provided with a linear bearing, the guide post passing through the linear bearing;

the auxiliary support has a support fixing hole;

the ventilator further comprises a support stud, the support stud having an end passing through the support fixing hole to be screwed to the guide post and another end configured to fix the cover plate assembly.

12. The ventilator according to claim 10, further comprising a first limit switch, a second limit switch, a limit lever, and a restoring spring, wherein:

the first limit switch and the second limit switch are both mounted at the auxiliary support and electrically connected to the controller and the lifting motor for driving the air guide sleeve to lift or lower;

the first limit switch has a contact facing towards the air guide sleeve and configured to detect a position where the air guide sleeve is furthest from the vent and an air duct opened state is generated;

the second limit switch has a contact facing away from the air guide sleeve;

the restoring spring is configured to exert an elastic force on the limit lever to restore the limit lever to an initial position; and the air guide sleeve is configured to move towards the vent to be in contact with the limit lever and drive the limit lever to move, activating the contact of the second limit switch by the limit lever to detect a position where the air guide sleeve is nearest to the vent and an air duct closed state is generated.

13. The ventilator according to claim 1, further comprising a rainwater sensor mounted at the housing body and electrically connected to the controller, wherein the rainwater sensor is configured to detect rainwater; and wherein the control is configured to control, in response to rainwater being detected by the rainwater sensor, the air guide sleeve to lower to cover the vent.

14. The ventilator according to claim 1, wherein the cover plate assembly comprises a cover body and a photovoltaic panel, wherein:

the photovoltaic panel is mounted at a side of the cover body facing away from the housing body;

the second accommodation space is formed between the cover body and the air guide sleeve; and the photovoltaic panel is electrically connected to the controller.

15. The ventilator according to claim 14, further comprising a storage battery provided in the second accommodation space and electrically connected to the photovoltaic panel.

16. The ventilator according to claim 1, wherein the panel is provided with an external power interface electrically connected to the controller.

17. The ventilator according to claim 1, wherein the fan blade is configured to:

drive, when rotating about the rotational axis of the fan blade in a first direction, airflow in the vent to flow from the cover plate assembly to the housing assembly; and drive, when rotating about the rotational axis of the fan blade in a direction opposite to the first direction, airflow in the vent to flow from the housing assembly to the cover plate assembly.

18. The ventilator according to claim 1 wherein an end of the body vent facing towards the air guide sleeve is provided with a seal.

19. A vehicle, comprising the ventilator according to claim 1, wherein the ventilator is mounted at a roof of the vehicle; and the cover plate assembly is located outside the roof.

* * * * *